(No Model.)
D. GRIFFITHS.
MACHINERY FOR MANUFACTURING PORTLAND CEMENT.
No. 313,203. Patented Mar. 3, 1885.
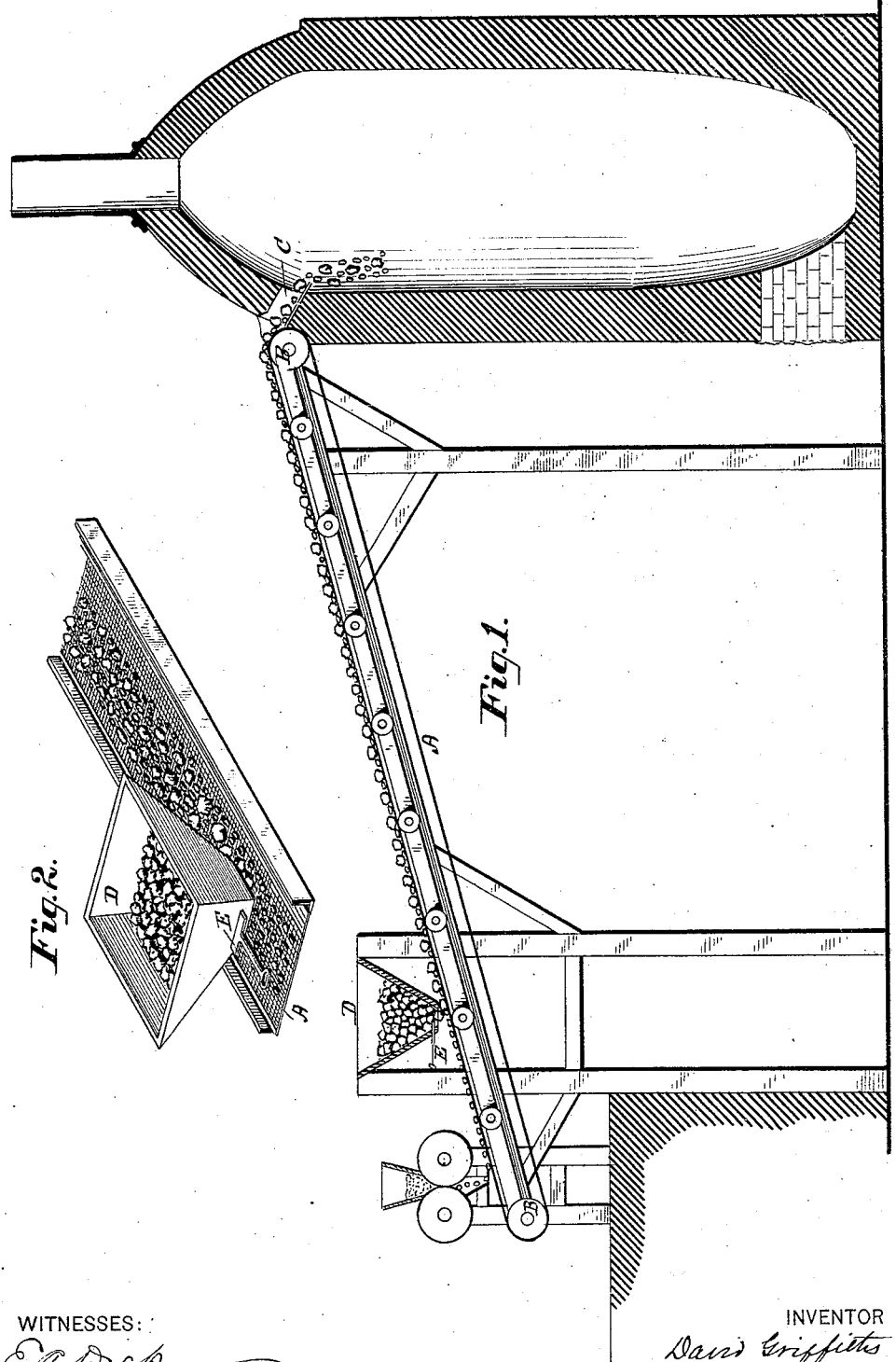

UNITED STATES PATENT OFFICE.

DAVID GRIFFITHS, OF EGYPT, PENNSYLVANIA.

MACHINERY FOR MANUFACTURING PORTLAND CEMENT.

SPECIFICATION forming part of Letters Patent No. 313,203, dated March 3, 1885.

Application filed June 14, 1884. (No model.)

*To all whom it may concern:*

Be it known that I, DAVID GRIFFITHS, of Egypt, Lehigh county, Pennsylvania, have invented a new and useful Improvement in Machinery for Manufacturing Portland Cement, of which the following is a specification.

Portland-cement composition or paste, when made by either the "dry" process or the "wet" process, both of which methods are well known to those skilled in the art, is usually molded into bricks of various sizes to fit it for burning. It has recently also been molded by compression between rolls into egg-shaped lumps for the same purpose. In all cases, however, it has been the custom to put the bricks or lumps of composition when prepared for burning into the kiln in layers, which layers are in turn placed between layers of coke or other combustible material. In order, therefore, to "set" or "charge" a kiln of Portland cement for burning, much time and much labor are required to place the bricks or forms in straight layers, and to form also the requisite layers of coke or other combustible which may be used. All this is done by hand with great trouble and expense, and entails, moreover, great loss in time in the delays thus caused by the charging of the kilns.

My invention has to do with this stage of the manufacture, and relates to the machinery for the purpose of putting the composition and the requisite amount of fuel for burning it simultaneously into the kiln, thus distributing the fuel more equally throughout the mass, insuring better burning, and doing away with the labor, trouble, and delay met with under former methods.

Figure 1 represents a side view of a belt-conveyer carrying egg-shaped lumps of Portland-cement composition from a molding or compressing machine to the kilns. A is the conveyer-belt; B B, the rollers upon which it runs. C is the opening at the top of the kilns. D is a hopper, of any suitable form, placed above the belt A, and having the adjustable mouth-piece E, of any suitable form, whereby the feed of the coke or other fuel may be accurately gaged.

Fig. 2 represents a view from above of the conveyer A, showing the lumps of composition covered with fuel, and also receiving their complement of fuel while passing under the hopper D.

In practical operation the fuel-hopper D, with the adjustable mouth-piece E, may be placed at any point on the conveyer between the molding machinery and the kiln, or, where the bricks are made by hand, between the molding-floors and the kilns; and while the flat belt A is the best form of conveyer adapted for the purpose, I do not desire to be understood to limit my invention to that form of conveyer alone, as I am aware that link-chain drags and other forms of conveyers may also be used for carrying the molded forms of composition from the molding machines or rooms to the kilns. Nor do I desire to restrict my invention to the particular form of hopper and mouth-piece here shown, as any hopper of any suitable form having a feed-piece of any design whereby the feed of the fuel can be gaged is suitable for the requirements of my invention.

As above stated, the machinery described enables the composition to be placed into the kilns without hand-labor, saves time in the charging of the kiln, secures a thorough distribution of the fuel throughout the kiln, gages the fuel accurately and automatically and proportions it properly to the composition to be burned, does away with the dangers of overcoking or undercoking likely to arise by the employment of manual labor at this important stage of the manufacture of cement, and produces a better and more uniformly-burned manufactured article.

Having thus described my invention, what I claim, and desire to secure by Letters Patent, is—

1. The hopper D, with the adjustable mouth-piece E, in combination with the conveyer A, substantially as described.

2. The hopper D, with the adjustable mouth-piece E, in combination with the conveyer A and the kiln C, substantially as described.

In testimony whereof I have hereunto set my hand this 12th day of June, 1884.

DAVID GRIFFITHS.

Witnesses:
A. D. KACHLINE,
OLIVER J. FRANTZ.